United States Patent [19]

Miki

[11] Patent Number: 5,047,840
[45] Date of Patent: Sep. 10, 1991

[54] LUMINANCE SIGNAL/CHROMINANCE SIGNAL SEPARATING CIRCUIT AND A NOISE REDUCTION CIRCUIT USING A 3 LINE LOGICAL COMB FILTER

[75] Inventor: Shigeru Miki, Osaka, Japan

[73] Assignee: Sanyo Electric Co., Ltd., Moriguchi, Japan

[21] Appl. No.: 543,009

[22] Filed: Jun. 25, 1990

[30] Foreign Application Priority Data

Jun. 26, 1989 [JP] Japan .................. 1-163111

[51] Int. Cl.⁵ ............................. H04N 9/78
[52] U.S. Cl. ........................... 358/31; 358/36
[58] Field of Search ............ 358/31, 36, 37, 314, 358/329

[56] References Cited

U.S. PATENT DOCUMENTS 4,524,382 6/1985 Tanaka et al. .
4,646,153 2/1987 Fukuda et al. .................. 358/167
4,984,069 1/1991 Yamada et al. .................. 358/31

FOREIGN PATENT DOCUMENTS 58-111596 7/1983 Japan ............................ 358/31
2169772A 7/1986 United Kingdom ............ 358/31

Primary Examiner—James J. Groody
Assistant Examiner—Kim Yen Vu
Attorney, Agent, or Firm—Armstrong, Nikaido, Marmelstein, Kubovcik & Murray

[57] ABSTRACT

A luminance signal/chrominance signal separating circuit comprises a 3 line logical comb filter for Y/C separation. The output of the vertical correlator of the 3 line logical comb filter comprises chrominance signal components and non-correlation components of the luminance signal, whereby the separated luminance signal components have the non-correlation components missing. The non-correlation components within the output of the vertical correlator are extracted by a trap circuit, and added to the separated luminance signal components. This prevents degradation of the oblique resolution of the reproduced luminance signal. The noise reduction circuit in the reproduction mode shares the above 3 line logical comb filter for removing the noise of the reproduced luminance signal.

8 Claims, 3 Drawing Sheets

LUMINANCE SIGNAL/CHROMINANCE SIGNAL SEPARATING CIRCUIT AND A NOISE REDUCTION CIRCUIT USING A 3 LINE LOGICAL COMB FILTER

BACKGROUND OF THE INVENTION

1. Field of the Invention

This invention relates to luminance signal/chrominance signal separating circuits and noise reduction circuits, and more particularly, to a luminance signal/chrominance signal separating circuit and a noise reduction circuit using a 3 line logical comb filter in a magnetic recording reproducing device such as a video circuit recorder (hereinafter referred to as a VCR).

2. Description of the Background Art

A VCR has been proposed using a comb filter, operating as a Y/C separating filter during recording for separating an input video signal into a luminance signal Y and a chrominance signal C (Y/C separation), and operating as a noise reduction circuit during reproduction for removing the small noise components in the reproduced luminance signal.

As an example of a comb filter, the so-called 3 line logical comb filter is known, such as the one described in U.S. Pat. No. 4,524,382, in which the comb type chrominance signal passing characteristic is implemented by using the bandpass filter (BPF) of each line for separating the chrominance signal components of 3 lines from the video signals of 3 lines to be logically processed.

A color TV signal (hereinafter referred to as video signal) of the NTSC system has the spectrum of luminance signal components and the spectrum of chrominance signal components alternately interleaved as shown schematically in the frequency spectrum diagram of FIG. 1 to avoid beat disturbance on the screen. Generally, when there is no difference between adjacent upper and lower horizontal lines, that is, when there is line correlation, luminance signal components are concentrated in the vicinity of the spectrum of n times (n is integer) the horizontal frequency $f_H$ (solid lines $Y_1$), while chrominance signal components are concentrated in the vicinity of the spectrum of $(n+\frac{1}{2})$ $f_H$ around 3.58 MHz (broken lines C). That is to say, Y signal components and C signal components are mutually frequency interleaved by $(\frac{1}{2})$ $f_H$. On the contrary, when there is difference between adjacent upper and lower horizontal lines, that is, when there is no line correlation, non-correlation components $Y_2$ and $Y_3$ of the Y signal are also generated in a low frequency spectrum region other than in the vicinity of $Y_1$ which is the frequency multiplied output of the horizontal frequency, i.e., in the frequency spectrum region shown by the broken lines (FIG. 1).

For example, in a VCR recording mode, a filter having a comb type chrominance signal band-pass characteristic periodically repeated at regular intervals in accordance with the repetition of the spectrum shown in FIG. 1 is required to extract chrominance signal components from the input video signal having such a frequency spectrum.

The previously mentioned 3 line logical comb filter is used as the filter having such a comb type band-pass characteristic of a chrominance signal. However, since the frequency characteristic of the BPF separating the chrominance signal components by each horizontal line from the video signals of three horizontal lines in the 3 line logical comb filter is relatively gentle, each BPF will separate the signal components of a wide band including the components of the luminance color band. This causes the chrominance signal components provided as the output of the 3 line logical comb filter by logical processing in accordance with the output of the BPFs to include the non-correlation components $Y_2$ and $Y_3$ of the low frequency range and the high frequency range of the luminance signal. In the case where luminance signal components are extracted by subtracting such chrominance signal components from the input video signal, even the non-correlation components are removed from the luminance signal components. This eliminates the luminance signal variation between the upper and lower lines, that is, in the vertical direction, resulting in a problem of degradation in non-correlation luminance signals, i.e., in oblique resolution of the picture on the screen.

The 3 line logical comb filter used as a Y/C separating filter in a recording mode as described above may be used as a noise reduction circuit that removes the noise components in the luminance signal during the reproduction mode of the VCR. However such a noise reduction circuit had a similar problem of the non-correlation components of the reproduced luminance signal being removed due to the reason described above with respect to the operation during recording.

SUMMARY OF THE INVENTION

Therefore, an object of the present invention is to prevent degradation of the oblique resolution of the reproduced picture of the VCR.

Another object of the invention is to provide a luminance signal/chrominance signal separating circuit that can separate the luminance signal components without removing the non-correlation components of the luminance signal.

A further object of the invention is to provide a color band noise reduction circuit that does not remove the non-correlation components in the reproduced luminance signal.

In summary, the luminance signal/chrominance signal separating circuit using a 3 line logical comb filter is formed so as to extract the non-correlation components of the luminance signal from the chrominance signal output of the 3 line logical comb filter to add to the luminance signal components separated by the 3 line logical comb filter.

In another aspect of the present invention, the noise reduction circuit is formed so as to add the non-correlation components of a separately extracted luminance signal to the reproduced luminance signal output of the 3 line logical comb filter.

The main advantage of the present invention resides in that the luminance signal variation between the horizontal lines are compensated due to the fact that the luminance signal components separated by the 3 line logical comb filter has the non-correlation components thereof added to prevent degradation of the oblique resolution.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
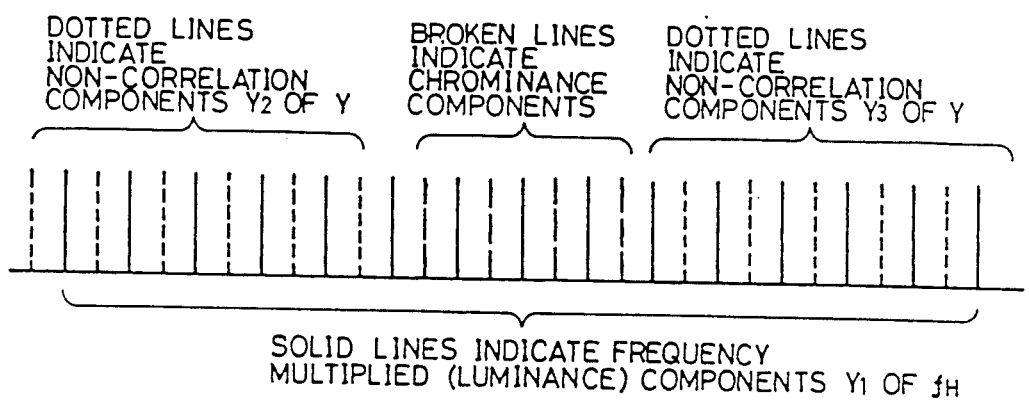
FIG. 1 is a diagram schematically showing the spectrum of the luminance signal component and the chrominance signal component.
Figure 2:
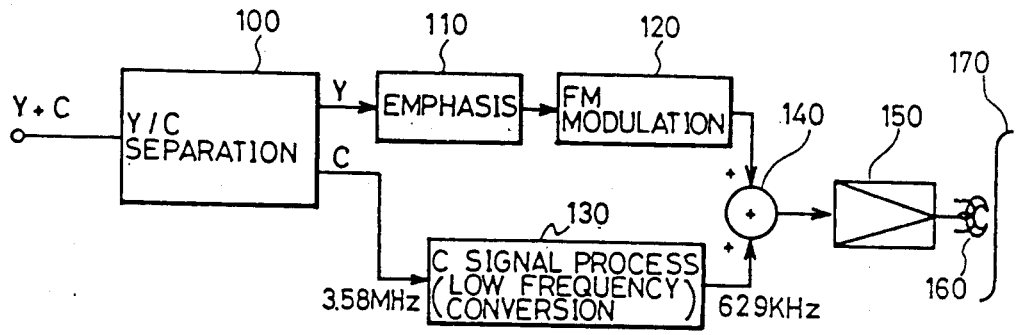
FIG. 2 is a block diagram schematically showing a circuit of a VCR video signal recording system including a Y/C separating circuit in accordance with one embodiment of the invention.

FIG. 2 is a block diagram schematically showing the circuit of a VCR video signal recording system including a Y/C separating circuit in accordance with one embodiment of the present invention. Referring to FIG. 2, an input video signal (Y+C) provided from a signal source such as a tuner (not shown) is applied to a Y/C separating circuit 100 implemented with a 3 line logical comb filter, to be separated into a Y signal and a C signal.

The Y signal extracted from the filter 100 is applied to an emphasis circuit 110. This extracted Y signal is emphasis processed by emphasis circuit 110 to be applied to a FM modulation circuit 120 for FM modulation. The FM modulated signal is applied to one input of an addition circuit 140.

Meanwhile, the C signal extracted from filter 100 is converted to a low frequency range signal of 629 KHz from 3.58 MHz by a chrominance signal processing circuit 130 to be applied to the other input of addition circuit 140. The Y and C signals mixed in addition circuit 140 are amplified by an amplifier 150 to be recorded on a magnetic tape 170 by a magnetic head 160.

Figure 3:
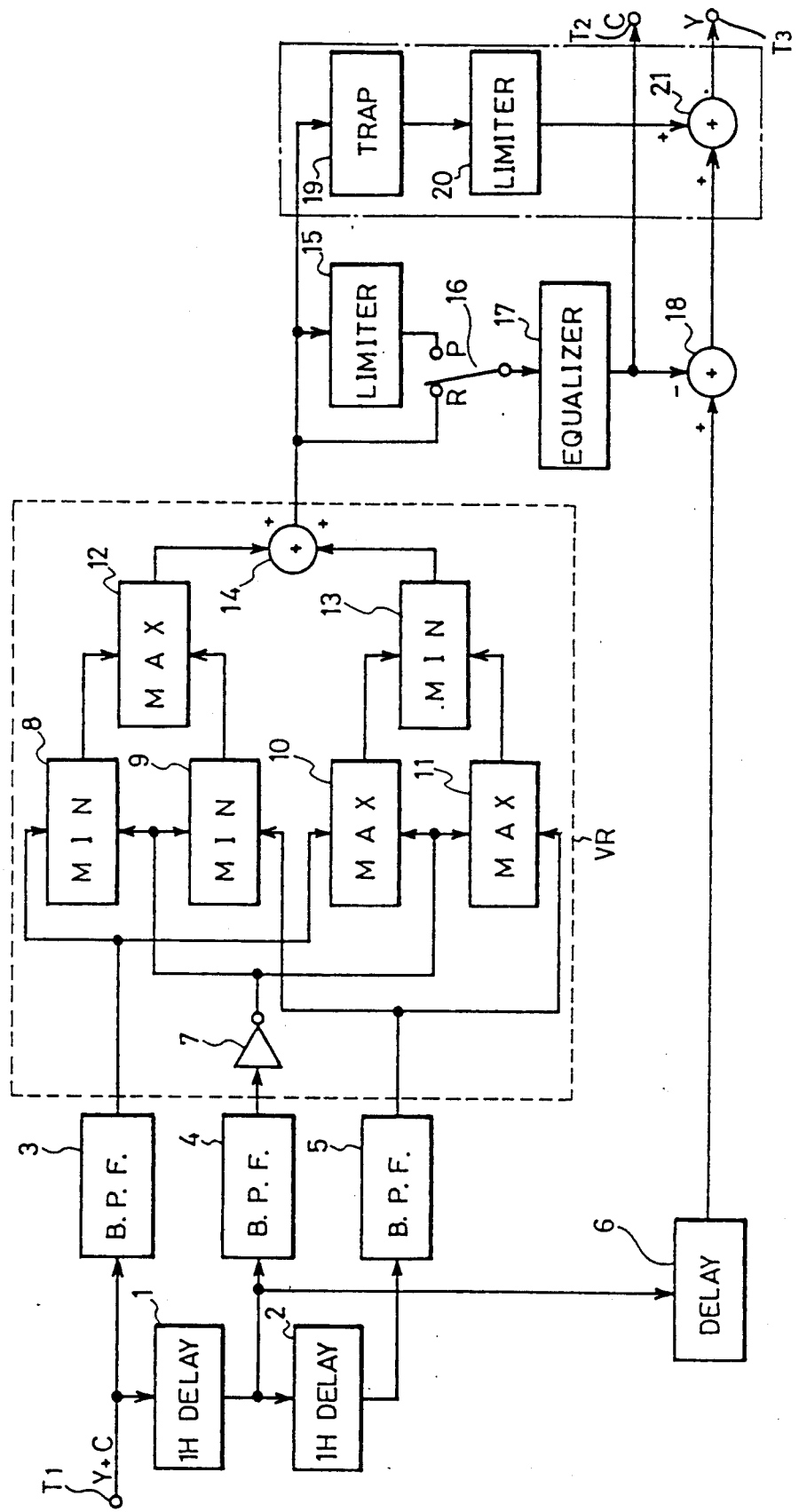
FIG. 3 is a block diagram showing the Y/C separating circuit of FIG. 2.

FIG. 3 is a block diagram showing the Y/C separating circuit 100 of FIG. 2 in greater detail.

Referring to FIG. 3, the previously mentioned input video signal (Y+C), or exactly ($Y_1+Y_2+Y_3+C$) including the non-correlation components of Y is provided to the input terminal $T_1$ of Y/C separating circuit 100. The input video signal is applied to a BPF 3, as well as to a 1H delay circuit 1 where it is delayed by 1 horizontal period. The output of 1H delay circuit 1 is applied to a BPF 4 and a delay circuit 6, as well as to a 1H delay circuit 2 to be further delayed by 1 horizontal period. The output of 1H delay circuit 2 is applied to a BPF 5.

The above BPFs 3, 4, and 5 are each designed to maintain (1) the level variation within the chrominance signal band to be within 1dB, (2) the phase variation to be within 4°, and (3) the group delay characteristic to be within 5n seconds, in order to maintain excellent comb type band-pass characteristic. This causes the frequency characteristics of each BPF to be inevitably gentle.

Each output of BPF 3, 4 and 5 is applied to a vertical correlator VR enclosed by a broken line. In greater detail, the output of BPF 3 is applied to one input of a minimum value selecting circuit (MIN) 8, as well as to one input of a maximum value selecting circuit (MAX) 10. The output of BPF 4 is inverted at an inverting circuit 7, to be applied to the other input of minimum value selecting circuit 8, to one input of a minimum value selecting circuit 9, to the other input of maximum value selecting circuit 10, and to one input of a maximum value selecting circuit 11. The output of BPF 5 is applied to the other input of minimum value selecting circuit 9, as well as to the other input of maximum value selecting circuit 11.

The output of minimum value selecting circuit 8 is applied to one input of a maximum value selecting circuit 12, while the output of minimum value selecting circuit 9 is applied to the other input of maximum value selecting circuit 12. Meanwhile, the output of maximum value selecting circuit 10 is applied to one input of a minimum value selecting circuit 13, and the output of maximum value selecting circuit 11 is applied to the other input of minimum value selecting circuit 13.

The outputs of maximum value selecting circuit 12 and minimum value selecting circuit 13 are added in an addition circuit 14 to be provided from the vertical correlator VR as the output of the 3 line logical comb filter. The output of this vertical correlator VR includes the above mentioned chrominance signal components and a portion of non-correlation components $Y_2$ and $Y_3$ of the luminance signal Y. Since the principle of the 3 line logical comb filter's operation is described in detail in the aforementioned U.S. Pat. No. 4,524,382, the description will be omitted here.

The output of the 3 line logical comb filter is applied to an equalizer 17 via a switch 16 that is switched to the R contact side during recording, to have the time of delay controlled. The output of equalizer 17 is provided from terminal $T_2$ as chrominance signal C, as well as to the negative input of a subtraction circuit 18.

Meanwhile, the output of 1H delay circuit 1 is applied to the positive input of subtraction circuit 18 via delay circuit 6. The delay circuit 6 fine-adjusts the delay time of the output of 1H delay circuit 1 so that the positive and negative inputs of subtraction circuit 18 are in phase.

As mentioned above, subtraction circuit 18 subtracts the chrominance signal components C and the non-correlation components $Y_2$ and $Y_3$ of Y provided to the negative input from the video signal ($Y_1+Y_2+Y_3+C$) provided to the positive input thereof. Consequently, the luminance signal component $Y_1$ without the non-correlation components $Y_2$ and $Y_3$ is provided from subtraction circuit 18 to be applied to one input of an addition circuit 21.

The output of the 3 line logical comb filter is also applied to a trap circuit 19. The trap circuit 19 cuts off only the chrominance signal components C from the output of the 3 line logical comb filter by the steep frequency characteristic and provides the output to a limiter 20. The limiter 20 extracts only the small signal components from the output of trap circuit 19 and applies it to the other input of an addition circuit 21 as the non-correlation components $Y_2+Y_3$ of the luminance signal Y. Accordingly, addition circuit 21 adds the luminance signal $Y_1$ from subtraction circuit 18 with the non-correlation components of Y missing, and the non-correlation components $Y_2+Y_3$ of Y from limiter 20. This output is provided as a luminance signal ($Y=Y_1+Y_2+Y_3$) through terminal $T_3$.

In accordance with one embodiment of the present invention, the non-correlation components $Y_2+Y_3$ of Y are added to the luminance signal component $Y_1$ extracted by the 3 line logical comb filter. As a result, the luminance signal variation between lines are compensated to prevent degradation of the oblique resolution.

Figure 4:
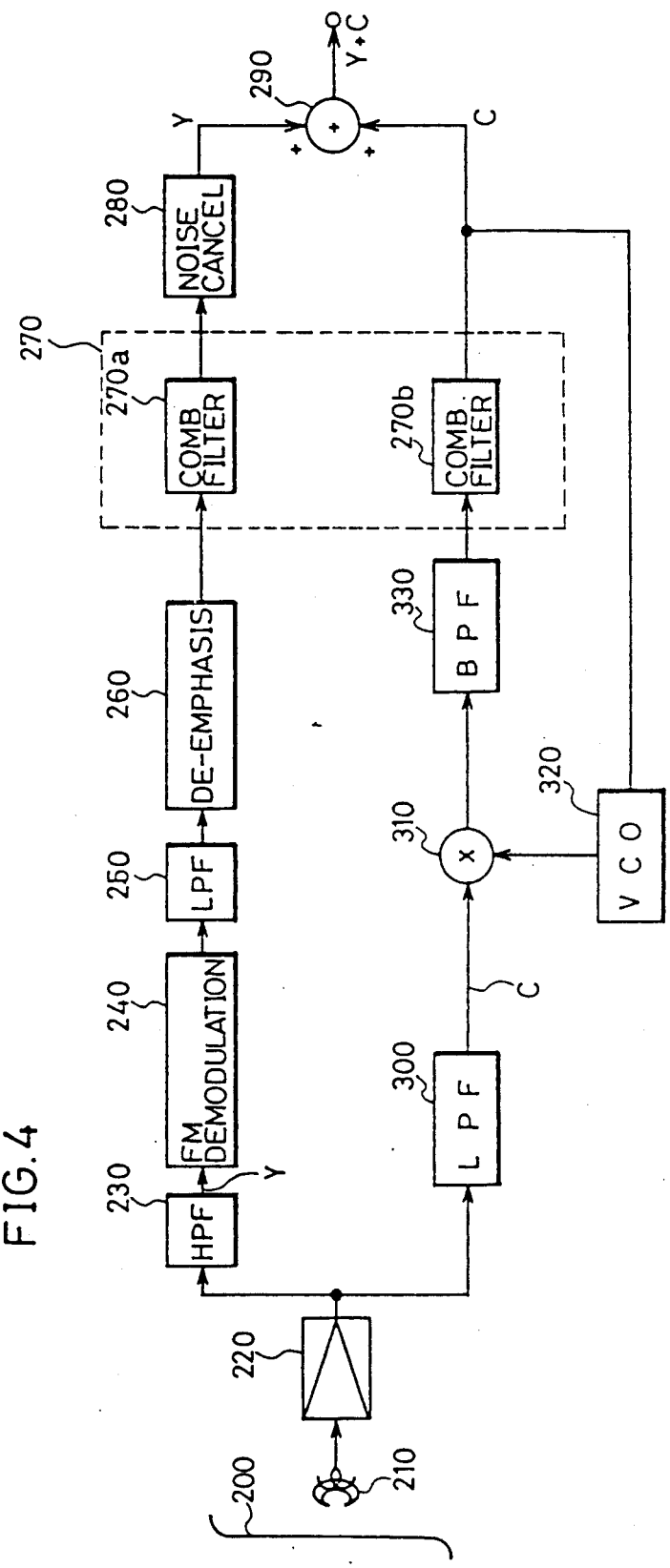
FIG. 4 is a block diagram schematically showing a circuit of a VCR video signal reproducing system including a noise reduction circuit in accordance with one embodiment of the invention.

FIG. 4 is a block diagram schematically showing the circuit of a VCR video signal reproducing system including a noise reduction circuit in accordance with one embodiment of the present invention. Referring to FIG. 4, a video signal recorded on a magnetic tape 200 is reproduced by a magnetic head 210 to be amplified by an amplifier 220. The luminance signal components Y of the output of amplifier 220 is extracted by a high pass filter (HPF) 230 to be FM demodulated by a FM demodulation circuit 240. The output of FM demodulation circuit 240 is applied to a de-emphasis circuit 260 via a low pass filter (LPF) 250 to be de-emphasized. The output of the de-emphasis circuit 260 is applied to a 3 line logical comb filter 270a forming a noise reduction circuit 270. The noise reduction circuit 270 suppresses the small noise components with respect to the Y signal and applies the output to a noise cancel circuit 280. The noise cancel circuit 280 is provided for the purpose of ensuring the required S/N ratio regarding the reproduced luminance signal from the magnetic head, and functions so as to diminish or cancel the high frequency range small signal of the input signal. One method for noise cancel is to extract the high frequency range small signal of the input signal by a HPF and a limiter and subtract it from the original signal. The Y signal having the noise components removed by noise cancel circuit 280 is applied to one input of an addition circuit 290.

Meanwhile, the chrominance signal components C of the output from amplifier 220 is extracted by a LPF 300 to be converted to a high frequency range by a high frequency range converting circuit 310 according to the output of an voltage controlled oscillator 320. The converted signal is applied to the other 3 line logical comb filter 270b forming the noise reduction circuit 270 via a BPF 330. The C signal having the cross talk components removed by noise reduction circuit 270 is applied to the other input of addition circuit 290, as well to VCO 320 to control the oscillating frequency of VCO 320. The reproduced video signal (Y+C) is provided from addition circuit 290.

The VCR in accordance with the present invention can share the 3 line logical comb filter for Y/C separation during recording of FIG. 3 as a 3 line logical comb filter 270a which forms the noise reduction circuit 270 of FIG. 4.

In the circuit of FIG. 3, the reproduced luminance signal Y from the de-emphasis circuit 260 of FIG. 4 is applied to terminal $T_1$ during reproduction by the VCR. The 3 line logical comb filter provides the output including the remaining color components and the non-correlation components $Y_2$ and $Y_3$ of the luminance signal Y in accordance with the input Y, and applies it to a limiter 15 and trap circuit 19. The limiter 15 controls the amplitude of the output of the 3 line logical comb filter and applies it to equalizer 17 through switch 16 which is switched to the P side contact during reproduction. The output of equalizer 17 is applied to the negative input of subtraction circuit 18 as the noise components.

Meanwhile, the reproduced luminance signal components Y delayed by 1 horizontal period by 1H delay circuit 1 is applied to the positive input of subtraction circuit 18. The subtraction circuit 18 subtracts the above mentioned noise components from the reproduced luminance signal Y. This will also remove the non-correlation components $Y_2$ and $Y_3$ of Y. Therefore, the non-correlation components $Y_2$ and $Y_3$ are extracted by trap circuit 19 and limiter 20 to be added to the output of subtraction circuit 18 by addition circuit 21, similar as in the case of the above mentioned recording. Thus, a reproduced luminance signal Y including the non-correlation components and having the noise components removed is provided from output terminal $T_3$.

In accordance with one embodiment of the present invention, the luminance signal components with the noise components removed by the 3 line logical comb filter has the non-correlation components thereof added. As a result, the luminance signal variation between lines is compensated to prevent degradation of the oblique resolution of reproduced pictures.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A luminance signal/chrominance signal separating circuit comprising:

means ($T_1$) for providing a color video signal including a luminance signal and a chrominance signal, logical comb filter means for separating said color video signal into said luminance signal and said chrominance signal, wherein said logical comb filter means comprises:

a first bandpass filter means (3) for extracting the signal components of the chrominance signal band from said color video signal, a first 1H delay means (1) for delaying said color video signal by 1 horizontal period, a second bandpass filter means (4) for extracting the signal components of the chrominance signal band from the output of said first 1H delay means, a second 1H delay means (2) for delaying the output of said first 1H delay means by 1 horizontal period, a third bandpass filter means (5) for extracting the signal components of the chrominance signal band from the output of said second 1H delay means, vertical correlator means (VR) for providing a signal including at least said chrominance signal in response to the outputs of said first, second, and third bandpass filter means, and subtraction means (18) for subtracting the output of said vertical correlator means from the output of said first 1H delay means, trapping means (19) for trapping the signal components of the chrominance signal band from the output of said vertical correlator means, limiting means (20) for limiting the amplitude of the output of said trapping means, and addition means (21) for adding the output of said limiting means to the output of said subtraction means to provide the result thereof as said luminance signal.

2. The luminance signal/chrominance signal separating circuit according to claim 1, wherein the output of said vertical correlator means further comprises the non-correlation components of said luminance signal.

3. The luminance signal/chrominance signal separating circuit according to claim 2, further comprising equalizer means (17) for controlling the time of delay of the output of said vertical correlator means.

4. The luminance signal/chrominance signal separating circuit according to claim 3, further comprising means (6) for making the phase of the output of said first 1H delay means applied to said subtraction means coincide with the phase of the output of said vertical correlator means.

5. A noise reduction circuit comprising:
means (T₁) for providing a reproduced luminance signal,
logical comb filter means for removing the noise components from said reproduced luminance signal, wherein said logical comb filter means comprises
   first bandpass filter means (3) for extracting the signal components of the chrominance signal band from said reproduced luminance signal,
   a first 1H delay means (1) for delaying said reproduced luminance signal by 1 horizontal period,
   a second bandpass filter means (4) for extracting the signal components of the chrominance signal band from the output of said first 1H delay means,
   a second 1H delay means (2) for delaying the output of said first 1H delay means by 1 horizontal period,
   a third bandpass filter means (5) for extracting the signal components of the chrominance signal band from the output of said second 1H delay means,
   vertical correlator means (VR) for providing a signal including at least the remaining chrominance signal components in response to the outputs of said first, second, and third bandpass filter means,
   a first limiting means (15) for controlling the amplitude of the output of said vertical correlator means, and
   subtraction means (18) for subtracting the output of said first limiting means from the output of said first 1H delay means,
trapping means (19) for trapping the signal components of the chrominance signal band from the output of said vertical correlator means,
a second limiting means (20) for controlling the amplitude of the output of said trapping means, and
addition means (21) for adding the output of said second limiting means to the output of said subtraction means to provide the result thereof as said reproduced luminance signal.

6. The noise reduction circuit according to claim 5, wherein the output of said vertical correlator means further comprises the non-correlation components of said reproduced luminance signal.

7. The noise reduction circuit according to claim 6, further comprising equalizer means (17) for controlling the time of delay of the output of said vertical correlator means.

8. The noise reduction circuit according to claim 7, further comprising means (6) for making the phase of the output of said first 1H delay means applied to said subtraction means coincide with the phase of the output of said vertical correlator means.

* * * * *